(12) United States Patent
Franke et al.

(10) Patent No.: US 9,753,202 B2
(45) Date of Patent: Sep. 5, 2017

(54) POLARIZING MULTILAYER FILM, METHOD OF USING SAME, AND METHOD FOR PRODUCING A DEVICE COMPRISING THE FILM

(71) Applicants: Thomas Franke, Laupheim (DE); Jens Rasmussen, Ulm (DE)

(72) Inventors: Thomas Franke, Laupheim (DE); Jens Rasmussen, Ulm (DE)

(73) Assignee: E.SOLUTIONS GmbH (DE)

( * ) Notice: Subject to any disclaimer, the term of this patent is extended or adjusted under 35 U.S.C. 154(b) by 0 days.

(21) Appl. No.: 14/519,946

(22) Filed: Oct. 21, 2014

(65) Prior Publication Data
US 2015/0109668 A1 Apr. 23, 2015

(30) Foreign Application Priority Data
Oct. 23, 2013 (DE) .................... 10 2013 017 627

(51) Int. Cl.
| | | |
|---|---|---|
| *G02B 5/30* | (2006.01) | |
| *B32B 37/12* | (2006.01) | |
| *B32B 37/18* | (2006.01) | |
| *B32B 38/10* | (2006.01) | |

(52) U.S. Cl.
CPC ............ *G02B 5/3083* (2013.01); *B32B 37/12* (2013.01); *B32B 37/18* (2013.01); *B32B 38/10* (2013.01); *G02B 5/30* (2013.01); *G02B 5/3033* (2013.01); *B32B 2309/105* (2013.01); *B32B 2457/202* (2013.01); *B32B 2457/208* (2013.01); *B32B 2551/00* (2013.01)

(58) Field of Classification Search
CPC ...... G02B 5/3083; G02B 5/30; G02B 5/3033; B32B 37/12; B32B 37/18; B32B 38/10

USPC .......................... 359/489.07, 483.01, 489.01
See application file for complete search history.

(56) References Cited

U.S. PATENT DOCUMENTS

| | | | | |
|---|---|---|---|---|
| 4,387,133 | A | | 6/1983 | Ichikawa et al. |
| 4,715,686 | A | * | 12/1987 | Iwashita .............. G02F 1/1333 349/122 |
| 6,066,378 | A | * | 5/2000 | Morii .................. G03H 1/0248 283/108 |
| 8,736,798 | B2 | * | 5/2014 | Kim .................... G02B 27/2214 349/117 |
| 2004/0155857 | A1 | * | 8/2004 | Duthaler .............. G02F 1/1334 345/107 |

(Continued)

FOREIGN PATENT DOCUMENTS

| | | |
|---|---|---|
| DE | 199 56 706 A1 | 5/2000 |
| DE | 10 2006 023 993 A1 | 3/2007 |

*Primary Examiner* — William R Alexander
(74) *Attorney, Agent, or Firm* — Tarolli, Sundheim, Covell & Tummino LLP

(57) ABSTRACT

A polarizing multilayer film is provided. The polarizing multilayer film comprises a first adhesive layer, a second adhesive layer, a polarization layer which is arranged between the first and second adhesive layers, a first separating film which is removably arranged on a side of the first adhesive layer remote from the polarization layer, and a second separating film which is removably arranged on a side of the second adhesive layer remote from the polarization layer. There are further provided a method of using the polarizing multilayer film and a method for producing a screen, a light-emitting decorative element or another device using the polarizing multilayer film.

9 Claims, 3 Drawing Sheets

(56) References Cited

U.S. PATENT DOCUMENTS

| | | | |
|---|---|---|---|
| 2005/0046767 A1* | 3/2005 | Freking | B32B 43/006 349/62 |
| 2005/0269020 A1* | 12/2005 | Matsuoka | B32B 33/00 156/235 |
| 2006/0108050 A1* | 5/2006 | Satake | B32B 3/02 156/101 |
| 2006/0175006 A1* | 8/2006 | Takahashi | H01G 9/10 156/308.2 |
| 2007/0056682 A1* | 3/2007 | Yamada | G02B 5/3083 156/249 |
| 2008/0204611 A1 | 8/2008 | Matsumoto et al. | |
| 2008/0254272 A1* | 10/2008 | Danner | G02F 1/1333 428/220 |
| 2008/0280037 A1* | 11/2008 | Sheridan | C09J 7/00 427/208.8 |
| 2010/0277786 A1* | 11/2010 | Anderson | B60R 1/088 359/247 |
| 2011/0104423 A1* | 5/2011 | Kitada | B32B 37/02 428/41.8 |
| 2011/0268929 A1* | 11/2011 | Tran | B32B 7/12 428/189 |
| 2011/0318577 A1* | 12/2011 | Masuda | C09D 183/04 428/352 |
| 2012/0241071 A1* | 9/2012 | Niimi | B32B 7/06 156/60 |
| 2012/0275024 A1* | 11/2012 | Marzen | G02F 1/133528 359/488.01 |
| 2013/0135564 A1* | 5/2013 | Miyazaki | G02F 1/133528 349/96 |
| 2013/0164478 A1* | 6/2013 | Yamamoto | B32B 7/12 428/41.8 |
| 2013/0321991 A1* | 12/2013 | Lee | C09J 7/02 361/679.01 |
| 2014/0071353 A1* | 3/2014 | Nashiki | G02F 1/13338 349/12 |
| 2016/0122599 A1* | 5/2016 | Kim | C09J 133/066 428/220 |
| 2016/0122600 A1* | 5/2016 | Moon | C09J 133/14 428/354 |

* cited by examiner

POLARIZING MULTILAYER FILM, METHOD OF USING SAME, AND METHOD FOR PRODUCING A DEVICE COMPRISING THE FILM

RELATED APPLICATIONS

The present invention claims priority from German Patent Application Serial No. 10 2013 017 627.1, filed on 23 Oct. 2013; the entirety of which is incorporated herein by reference.

TECHNICAL FIELD

The present invention relates generally to the field of multilayer films. It relates in particular to a polarizing multilayer film, for example for producing a screen or a light-emitting decorative element.

BACKGROUND

In many screens, in particular those with liquid crystal displays, optical polarizers are used. However, as well as acting as spectral filters in connection with liquid crystal displays, polarizers are also used to prevent light from the area surrounding the screen from entering the screen structure and leaving it again after being reflected in the interior of the screen. If ambient light were able to enter the screen unhindered and be reflected back out again, this would not only reduce the visibility of the screen display but also result in an undesirable appearance of the screen when it is switched off.

In the structure of a screen, polarizers are conventionally used in the form of layers within a more complex layer structure. In order to prevent ambient light from entering the layer structure as described above, it is advantageous if a polarization layer is arranged in an upper region of the layer structure, that is to say close to a screen surface. Thus, a polarization layer is often arranged immediately beneath a screen cover, conventionally a cover glass. Further components of the screen structure, such as, for example, in the case of a touch screen, a contact sensor layer or elements of a display assembly group, can then be arranged beneath the polarization layer.

In currently common methods for producing a screen of the described type, a polarization layer is laminated to the rear side of the cover glass by means of optically clear adhesive. In addition, a layer of optically clear adhesive is laminated to a substrate in the screen structure, for example a touch sensor layer provided beneath the polarization layer, or, when liquid adhesives are used, a liquid adhesive layer is applied. The cover glass including the polarization layer and the substrate provided with adhesive can then be laminated to one another in a further method step.

The described methods for producing screens having polarization layers have been found to be comparatively complex in practice. The same is true for the use of polarizers in other fields, such as, for example, in the case of light-emitting decorative elements.

SUMMARY

There is therefore to be provided a solution for the more simple production of light-emitting devices and other devices having polarization layers.

According to a first aspect there is provided a polarizing multilayer film. The multilayer film comprises a first adhesive layer, a second adhesive layer, a polarization layer which is arranged between the first and second adhesive layers, a first separating film which is removably arranged on a side of the first adhesive layer remote from the polarization layer, and a second separating film which is removably arranged on a side of the second adhesive layer remote from the polarization layer.

The first and/or second adhesive layer can comprise optically clear adhesive. In addition, the first and/or second adhesive layer can comprise a pressure sensitive adhesive (PSA). The first adhesive layer can further have a thickness of between 5 and 50 micrometers, for example between 30 and 40 micrometers. The second adhesive layer can have a thickness of between 50 and 400 micrometers, for example between 100 and 200 micrometers.

The thicknesses of the first and/or second adhesive layer can generally be so chosen that successively laminating the multilayer film to rigid or flexible surfaces arranged on opposite sides of the multilayer film by means of the first and second adhesive layers is assisted. For example, the thicknesses of the adhesive layers can be so chosen that the multilayer film can first be laminated by means of the first adhesive layer to a first rigid surface arranged on the side of the first adhesive layer and can then be laminated, together with the first rigid surface, by means of the second adhesive layer, to a second rigid surface arranged on the side of the second adhesive layer.

The polarization layer can comprise a circular polarizer. The circular polarizer can comprise a linear polarizer and a first retarder layer in the form of a quarter-wave layer for an optical wavelength in the visible range. The polarizing multilayer film can further comprise a second retarder layer in the form of a half-wave layer for an optical wavelength in the visible range. The second retarder layer can be arranged between the first and second adhesive layers. The half-wave layer can be arranged, for example, between the linear polarizer and the quarter-wave layer.

The linear polarizer and all the retarder layers can additionally be adhesively bonded to one another. The adhesive bonds can comprise pressure sensitive adhesive, PSA. In addition, the adhesive bonds can each have a thickness of between 5 and 50 micrometers, for example between 12 and 35 micrometers.

The optical and mechanical properties of the polarizing multilayer film without separating films may exhibit no significant impairment after at least five hundred hours' continuous exposure to an ambient temperature of 60° C. at a relative humidity of between 92 and 95% and/or after at least five hundred hours' continuous exposure to an ambient temperature of 95° C. Such properties of the polarizing multilayer film make it particularly suitable for use in the motor vehicle sector, for example inside a passenger compartment.

The separating films can allow the polarizing multilayer film to be handled separately. Furthermore, at least one of the separating films can be part of a packaging of the multilayer film. The multilayer film can therefore be produced and marketed as an intermediate product. In particular, the multilayer film can be used independently of its production.

According to a second aspect there is provided a method of using a polarizing multilayer film for producing a device, in particular a light-emitting device, wherein the polarizing multilayer film comprises a first adhesive layer, a second adhesive layer, a polarization layer which is arranged between the first and second adhesive layers, a first separating film which is removably arranged on a side of the first adhesive layer remote from the polarization layer, and a second separating film which is removably arranged on a side of the second adhesive layer remote from the polarization layer, the method comprising removing the first and second separating films from the multilayer film, and arranging the multilayer film without the separating films between a functional assembly group and an upper structure of the device.

According to a third aspect there is provided a method for producing a device, in particular for use in a motor vehicle, using a polarizing multilayer film, wherein the polarizing multilayer film comprises a first adhesive layer, a second adhesive layer, a polarization layer which is arranged between the first and second adhesive layers, a first separating film which is removably arranged on a side of the first adhesive layer remote from the polarization layer, and a second separating film which is removably arranged on a side of the second adhesive layer remote from the polarization layer, and wherein the method comprises the following steps: providing an upper structure, removing the first separating film from the first adhesive layer, adhesively bonding the polarizing multilayer film without the first separating film to the upper structure by means of the first adhesive layer, providing a functional assembly group, removing the second separating film from the second adhesive layer, and adhesively bonding the polarizing multilayer film without the second separating film to the functional assembly group by means of the second adhesive layer.

At least one of the adhesive bonding steps can comprise laminating. However, other types of adhesive bonding are also conceivable.

The method can further comprise removing air inclusions in the adhesive bonds by means of autoclaving. The removal of air inclusions can be preceded by the optional determination of air inclusions. In addition or alternatively, the determination of air inclusions, for example within the context of process monitoring, can follow the removal of air inclusions.

The upper structure can comprise a covering layer. The covering layer can be transparent and can be in rigid or flexible form. It can comprise a cover glass. In addition or alternatively, the covering layer can comprise transparent plastics material.

The method can be used to produce a screen, wherein the functional assembly group comprises a display of the screen. The display can be an LCD display.

The screen can be a touch-sensitive screen. In that case, the functional assembly group can comprise a touch sensor layer which is arranged on one side of the functional assembly group, the polarizing multilayer film being adhesively bonded to the touch sensor layer of the functional assembly group by means of the second adhesive layer. The touch sensor layer can be adhesively bonded to the display of the display assembly group by means of liquid bonding material.

It is also possible for the functional assembly group to comprise a touch sensor layer but not a display. The device is then suitable for use as a touch pad.

In addition or alternatively, the method can be used to produce a light-emitting decorative element, wherein the functional assembly group comprises a light source of the light-emitting decorative element or an optical fibre.

BRIEF DESCRIPTION OF THE DRAWINGS

Further advantages, details and features of the device described herein, of its use and of the method described herein will become apparent from the following description of embodiments and from the figures, in which.

DETAILED DESCRIPTION

Figure 1:
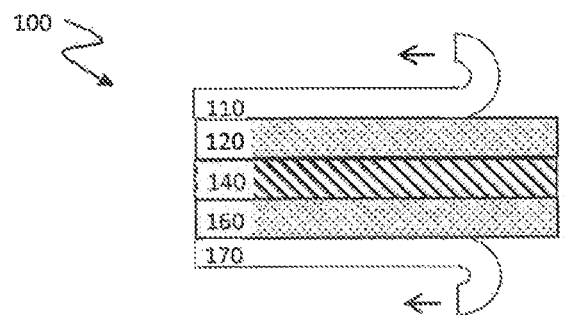
FIG. 1 shows a schematic representation of an embodiment of a polarizing multilayer film.

FIG. 1 shows a schematic view of an embodiment of a polarizing multilayer film 100, for example for use in the production of a screen or a decorative element.

In the embodiment shown in FIG. 1, the polarizing multilayer film 100 comprises, in the following order, a first separating film 110, a first adhesive layer 120, a polarization layer 140, a second adhesive layer 160, and a second separating film 170. As is shown by the arrows in FIG. 1, the separating films 110, 170 are removably arranged in the composite of the multilayer film 100. The multilayer film 100 is therefore a self-adhesive film which, after removal of the separating films 110, 170, is used, for example, to produce a screen or a decorative element.

For the uses of the multilayer film 100 that are described in the following, it can be advantageous if the adhesive layers 120, 160 consist of optically clear adhesive, for example of optically clear pressure sensitive adhesive (PSA). In addition, the polarization layer 140 can comprise a linear polarizer or a circular polarizer, depending on the intended use of the multilayer film 100.

The separating films 110, 170 are arranged on surfaces of the first and second adhesive layers and thus allow the multilayer film to be handled separately, for example for separate packaging, transport and storage of the multilayer film, but also for alignment and processing when the multilayer film is used to produce a screen, a light-emitting decorative element or another device. The separating films can consist, for example, of non-adhesive plastics material.

In the case of the multilayer film 100 presented herein, it is possible that one or both of the separating films consist of a packaging of the multilayer film, which is provided for storage and transport purposes. To that end it is possible, for example, for the two separating films to project beyond an edge of the other film layers and to be bonded together in their projecting edge regions. Alternatively, it is conceivable for a multilayer film to have only one separating layer and to be stored and transported in the rolled-up state in the manner of a roll of adhesive tape, with the exposed adhesive layer facing inwards. In this case, a first surface of the separating layer forms the first separating film and an opposing second surface of the separating layer forms the second separating film.

Figure 2:
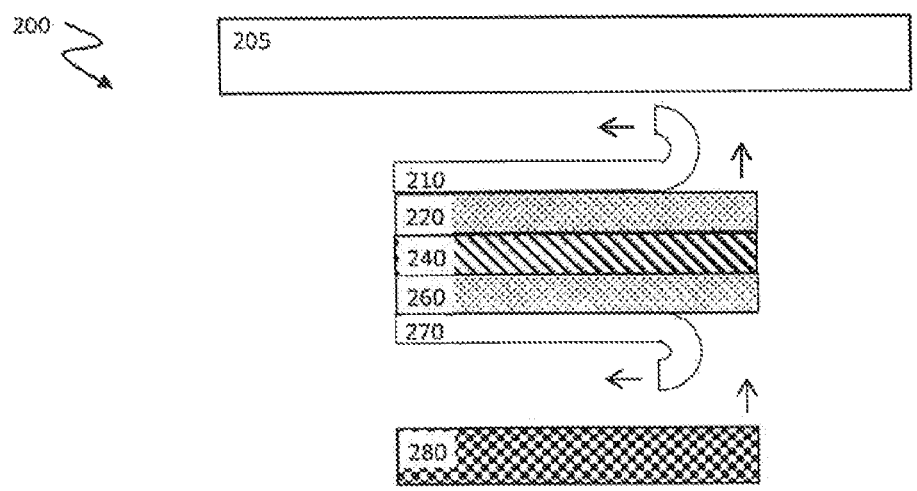
FIG. 2 shows a schematic representation of an embodiment of a method for producing a screen or a light-emitting decorative element using a polarizing multilayer film.

FIG. 2 shows a schematic view of an embodiment of a method for producing a screen or light-emitting decorative element 200, in particular for use in a motor vehicle, using a polarizing multilayer film of the type presented herein.

In the method shown in FIG. 2 for producing the screen or light-emitting decorative element 200, an upper structure 205, a multilayer film consisting of a first separating film 210, a first adhesive layer 220, a polarization layer 240, a second adhesive layer 260 and a second separating film 270, and a light-emitting assembly group 280 are used. The arrows additionally shown in FIG. 2 represent schematically individual steps of the production method.

In the present embodiment, the upper structure 205 is a rigid covering layer of the screen or light-emitting decorative element 200, for example in the form of a cover glass. In alternative embodiments, however, the upper structure 205 can also comprise transparent plastics material or other transparent, rigid materials. In addition, in the embodiment shown, the light-emitting assembly group 280 comprises a liquid crystal, LCD, display. In alternative embodiments, in particular in the case of light-emitting decorative elements, the light-emitting assembly group 280 can comprise a light source of any kind.

The method shown in FIG. 2 can be described as follows with reference to the flow diagram of FIG. 3. In a first method step 310, an upper structure 205 is provided. In a second method step 320, the first separating film 210 is removed from a polarizing multilayer film 210, 220, 240, 260, 270 of the type described with reference to FIG. 1. The multilayer film without the first separating film 210 is then adhesively bonded to the underside of the upper structure 205 by means of the first adhesive layer 220, which is now exposed, step 330. Analogously to this adhesive bonding of the polarizing multilayer film to the upper structure, bonding of the multilayer film to the underlying light-emitting assembly group 280 is effected by first providing 340 such a light-emitting assembly group 280, removing 350 the second separating film 270 from the multilayer film, and finally adhesively bonding 360 the upper structure, including the multilayer film without the second separating film, to the light-emitting assembly group 280 by means of the second adhesive layer 260, which is now exposed. Steps 330 and 360 can also be carried out in a different order.

The adhesive bonding of the multilayer film to components of the screen and/or light-emitting decorative element 200 that are located above and/or beneath it can take place in each case by laminating. The components to be adhesively bonded in a particular case can be brought into contact with one another, whereupon, by external pressure on an outer side of one of the components, for example by means of a laminating roller, the adhesive bond between the components is pressed smoothly.

The use of the second separating film 270, in particular in the first adhesive bonding step 330, permits simpler handling of the multilayer film and thus a simpler method. In addition, the separate provision of a self-adhesive polarizing multilayer film of the type presented herein renders obsolete the application of an adhesive layer to the sensitive display assembly group of the screen, as is necessary in conventional production methods, in particular for screens. The number of laminating operations required is accordingly reduced in the method presented herein. On the other hand, the separate manufacture and provision of a self-adhesive polarization film of the presented type would be possible with a much lower outlay. The total outlay required for manufacturing the screen and the logistics necessary therefor are thus reduced considerably by the solution presented herein.

The production method that is presented promises particular advantages in the production of screens in smaller piece numbers, such as, for example, for the automotive sector. In a preferred embodiment of the method presented herein, the object 200 to be produced is therefore a touch-sensitive screen for use in a motor vehicle. In that case it is advantageous if all the components of the multilayer film, that is to say of the multilayer film without the separating films, that are incorporated into the screen structure satisfy prevailing quality requirements for the automotive sector. Thus, the optical and mechanical properties in particular of the polarizing multilayer film without the separating films are not to exhibit significant impairment after at least five hundred hours' continuous exposure to an ambient temperature of 60° C. at a relative humidity of between 92 and 95% and/or after at least five hundred hours' continuous exposure to an ambient temperature of 95° C. The same quality requirements can, however, also be necessary for light-emitting decorative elements, for example when such a decorative element is to be used in the passenger compartment of a motor vehicle.

Figure 3:
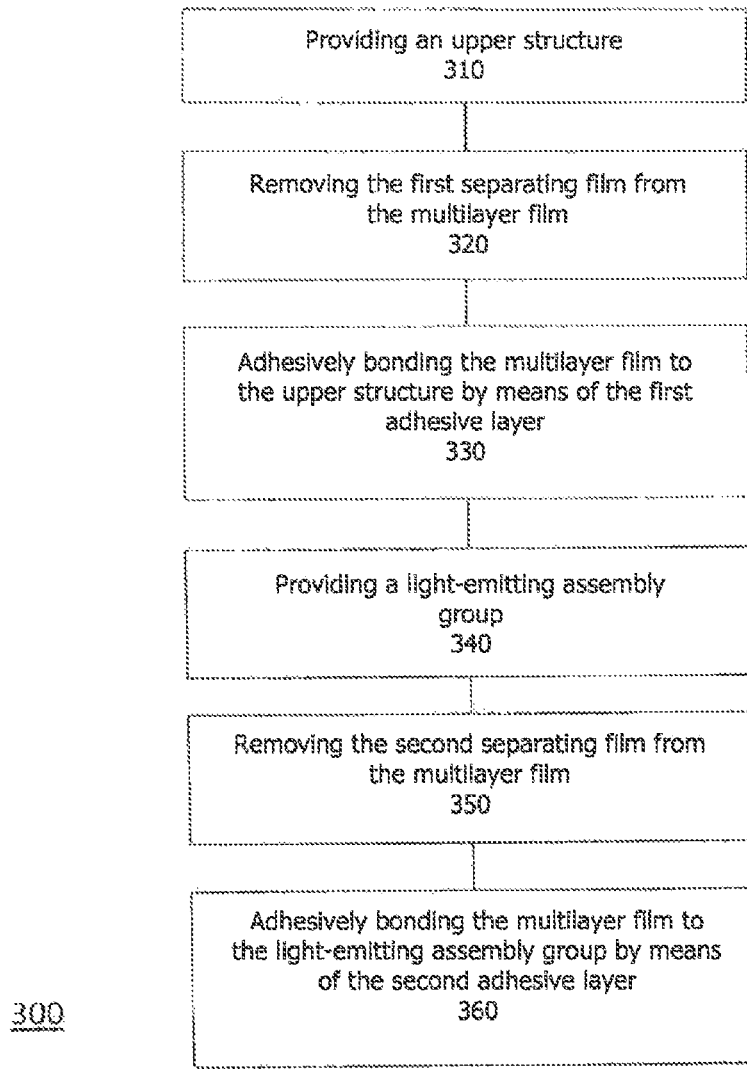
FIG. 3 shows a flow diagram of an embodiment of a method for producing a screen or a light-emitting decorative element using a polarizing multilayer film.

In addition to the method steps shown in FIGS. 2 and 3, the described method can additionally comprise the determination of air inclusions in the adhesive bonds and the removal of such air inclusions, for example by means of autoclaving. Such a determination of air inclusions can follow the second adhesive bonding step 360 directly. Alternatively, a standard method step for removing possible air inclusions could take place first, and the determination of any air bubbles still present could be carried out in a subsequent quality control operation.

Figure 4:
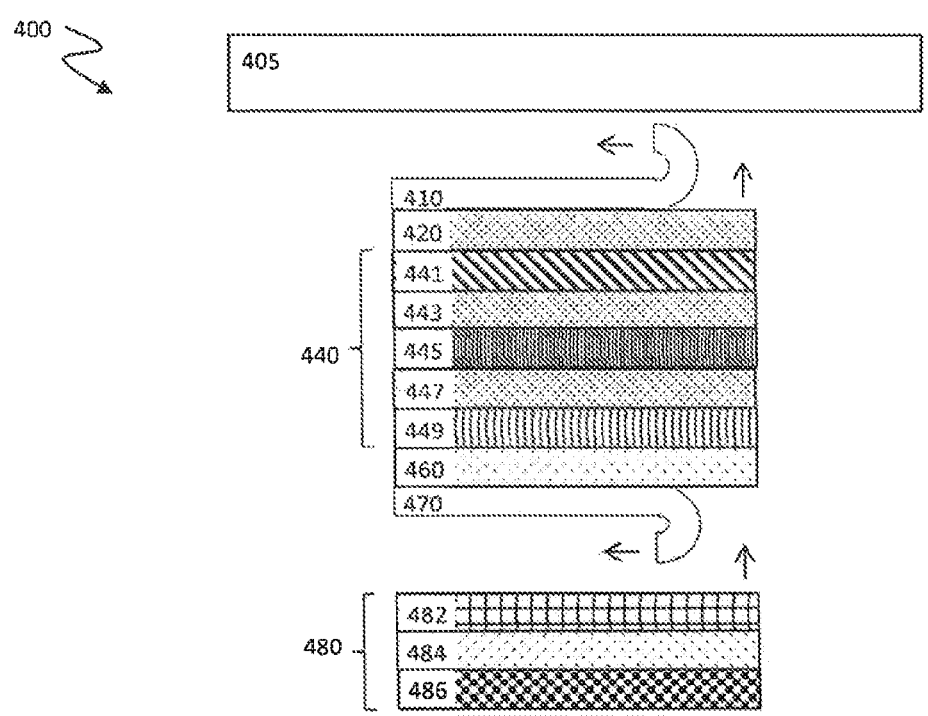
FIG. 4 shows a schematic representation of a second embodiment of a method for producing a screen using a polarizing multilayer film.

FIG. 4 shows a schematic view of a second embodiment of a method for producing a screen 400, for example for use in a motor vehicle, using a polarizing multilayer film of the type presented herein.

In addition to the method steps and components known from FIG. 2, that is to say an upper structure 405, a multilayer film having a first separating film 410, a first adhesive layer 420, a polarization layer 440, a second adhesive layer 460 and a second separating film 470, and a light-emitting assembly group 480, FIG. 4 shows in particular a multilayer film whose polarization layer 440 comprises a linear polarizer 441, a half-wave layer 445 having a reference wavelength in the visible range, and a quarter-wave layer 449 having a reference wavelength in the visible range. These layers, which together form a circular polarizer with a broad light spectrum, are further adhesively bonded together by further adhesive layers 443, 447.

The light-emitting assembly group 480 shown in FIG. 4 additionally comprises a touch sensor layer 482, which is attached to an LCD display 486 by means of a layer 484 of liquid bonding material. In the embodiment of the production method shown, the multilayer film 420, 440, 460 is adhesively bonded directly to the touch sensor layer 482 of the light-emitting assembly group 480 after removal of the second separating film 470.

In the embodiment of FIG. 4, the first adhesive layer 420 consists of optically clear pressure sensitive adhesive, PSA, and has a thickness of between 30 and 40 micrometers, while the second adhesive layer 460 of a transparent adhesive has a thickness of between 100 and 200 micrometers. In alternative embodiments, however, good results can still be achieved also with other adhesives and with layer thicknesses between 5 and 50 micrometers for the first adhesive layer 420 and with layer thicknesses between 50 and 400 micrometers for the second adhesive layer 460. In addition, the further adhesive layers 443, 447 preferably also consist of pressure sensitive adhesive, PSA, with layer thicknesses in the range of between 12 and 35 micrometers, but other adhesives and layer thicknesses, for example between 5 and 50 micrometers, are also suitable here.

The linear polarizer 441 contained in the polarization layer 440 forms together with the quarter-wave layer 449 a simple circular polarizer for a reference optical wavelength in the visible range. Such a circular polarizer would no longer ideally polarize optical wavelengths outside the reference wavelength, the quality of the polarization decreasing with the difference between a corresponding wavelength and the reference wavelength. This effect can be partially reduced by adding a suitable half-wave layer 445, so that the light spectrum for which the circular polarizer provides polarization of good quality is correspondingly broadened. In the example shown, the half-wave layer 445 is arranged between the linear polarizer 441 and the quarter-wave layer 449. In alternative embodiments, the half-wave layer 445 can, however, also be arranged at different locations in the multilayer film between the first and second adhesive layers 420, 460.

It will be appreciated that the various features of all the embodiments presented herein can be combined as desired in further forms. In particular, the multilayer film 420, 440, 460 from FIG. 4 is also able to meet the quality requirements specified in connection with FIG. 2 for use in a motor vehicle, and the light-emitting assembly group can also comprise a touch sensor layer located on its surface when a linear polarizing multilayer film is used.

It will further be appreciated that the polarizing multilayer film presented herein can also be used for purposes other than the production of a screen or a light-emitting decorative element. For example, the multilayer film could be used, for example, in touch-control elements which are provided with a transparent cover. For the production of such a touch-control element, the upper structure 205, 405 of FIGS. 2 and 4 could, for example, correspond to such a transparent cover and the assembly group 280, 480 in FIGS. 2 and 4 could correspond to a touch panel having a touch sensor layer (but without a light-emitting display). The same optical advantages are obtained as described above in relation to the polarization layer 440.

The invention claimed is:

1. Polarizing multilayer film comprising:
   a first adhesive layer;
   a second adhesive layer;
   a polarization layer which is arranged between the first and second adhesive layers;
   a first separating film which is removably arranged on a side of the first adhesive layer remote from the polarization layer; and
   a second separating film which is removably arranged on a side of the second adhesive layer remote from the polarization layer,
   wherein the first and the second separating films project beyond an edge of the other layers of the multilayer film to form projecting edge regions of the first and the second separating films, and
   wherein the first and the second separating films are bonded together in the projecting edge regions to provide a packaging of the multilayer film.

2. Polarizing multilayer film according to claim 1, wherein at least one of the first and second adhesive layer comprises optically clear adhesive.

3. Polarizing multilayer film according to claim 1, wherein at least one of the first and second adhesive layer comprises a pressure sensitive adhesive, PSA.

4. Polarizing multilayer film according to claim 1, wherein the first adhesive layer has a thickness of between 5 and 50 micrometers.

5. Polarizing multilayer film according to claim 1, wherein the second adhesive layer has a thickness of between 50 and 400 micrometers.

6. Polarizing multilayer film according to claim 1,
   wherein the polarization layer comprises a circular polarizer comprising a linear polarizer and a first retarder layer in the form of a quarter-wave layer for an optical wavelength in the visible range, and
   wherein the polarizing multilayer film further comprises a second retarder layer in the form of a half-wave layer for an optical wavelength in the visible range, wherein the second retarder layer is arranged between the first and second adhesive layers,
   wherein the half-wave layer is arranged between the linear polarizer and the quarter-wave layer.

7. Polarizing multilayer film according to claim 6, wherein the linear polarizer and all the retarder layers are each adhesively bonded to one another.

8. Polarizing multilayer film according to claim 1, wherein no impairment of one or more properties of the polarizing multilayer film is measurable after at least five hundred hours' continuous exposure of the polarizing multilayer film without the separating films to an ambient temperature of 60° C. at a relative humidity of between 92 and 95% and/or after at least five hundred hours' continuous exposure to an ambient temperature of 95° C.

9. Polarizing multilayer film according to claim 1, wherein the separating films allow the polarizing multilayer film to be handled separately.

* * * * *